Feb. 13, 1934. T. E. C. LINTERN 1,947,346
MEANS FOR LIFTING OR JACKING-UP AUTOMOBILES OR OTHER ROAD VEHICLES
Filed March 30, 1933
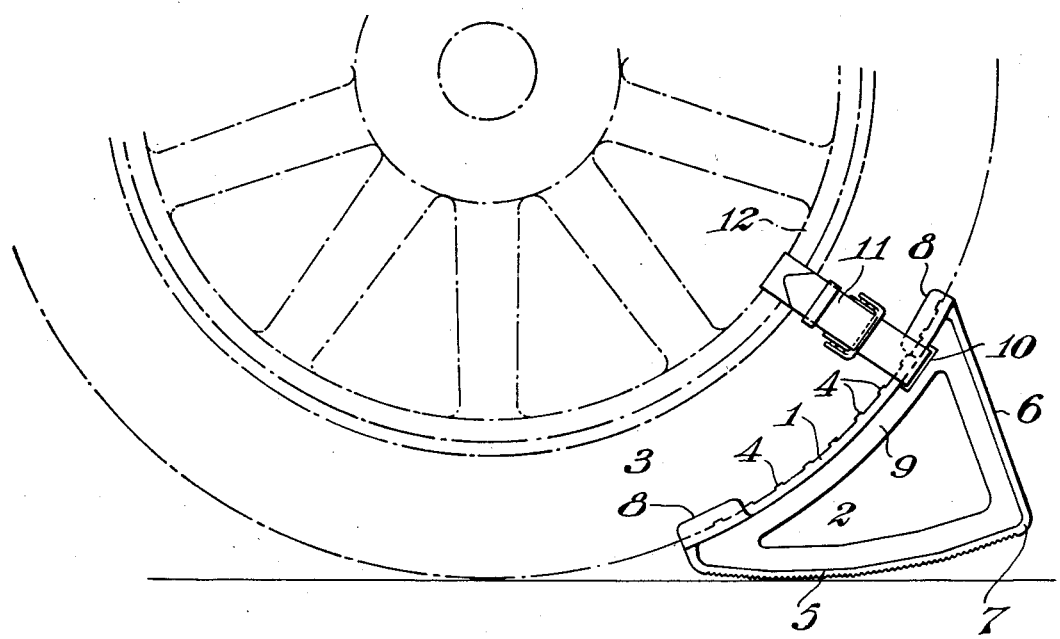
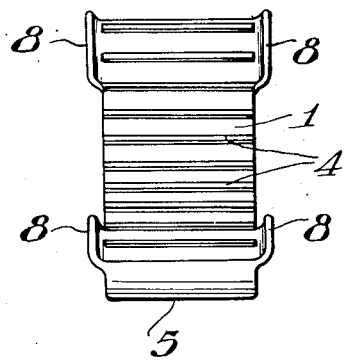
INVENTOR.
THOMAS ERNEST CHARLES LINTERN
BY Benj. T. King
ATTORNEY.

Patented Feb. 13, 1934

1,947,346

UNITED STATES PATENT OFFICE 1,947,346

MEANS FOR LIFTING OR JACKING - UP AUTOMOBILES OR OTHER ROAD VEHICLES

Thomas Ernest Charles Lintern, Cardiff, Wales

Application March 30, 1933, Serial No. 663,475, and in Great Britain February 22, 1932

1 Claim. (Cl. 254—94)

This invention, which relates to the lifting or jacking-up of automobiles and other road vehicles, has for its object the provision of a means for effecting the lifting or jacking-up of said vehicles without necessitating the use of a jack proper, or pump, and in the case of automobiles by using the motor power itself, for the purpose of changing wheels in the event of a wheel with a punctured pneumatic tyre, or wheel with other damaged tyre, or for any other required purpose.

With the above objection in view, the invention consists of a wedge, chock, or cradle, adapted to be positioned between the tyre of a wheel and the ground, and having an upper face or side radiused to suit the outer diameter of the tyre, and a lower face or side lying substantially upon an arc struck from a point eccentric to the centre of the wheel and below and towards one side of said centre, so as to provide a shifting fulcrum on which said wedge, chock, or cradle is adapted to roll, means being provided for detachably securing the wedge, chock, or cradle to the wheel, and also for preventing sideways movement of the said wedge, chock, or cradle.

The wedge, chock, or cradle is made of any suitable metal or other material, or a combination of materials, and is of a section suitable for the purpose of the same.

For a ready understanding of the invention, reference is to be had to the following description and accompanying sheet of drawings illustrative of a practical embodiment of the invention, and wherein:—

Figure 1 is a side elevational view showing the wedge, chock, or cradle in its operative position.

Figure 2 is an end view of said wedge, chock, or cradle.

In carrying out the invention, and referring to the drawing, the curved upper face of the wedge, chock, or cradle 2 is radiused to suit the tyre 3, and said upper face 1 is provided with ribs or serrations 4, disposed transversely of said face 1, to effect a sure grip on the tyre 3 aforesaid.

The lower curved face 5 of the wedge, chock, or cradle 2, where it adjoins the base 6 of said wedge, chock or cradle 2, is sharply inwardly bent to form a heel 7 and then curved upwardly to meet the upper face 1 of the wedge, chock, or cradle 2 aforesaid.

The wedge, chock, or cradle 2 is, at each side of the upper face 1, and at both ends thereof, provided with opposed lugs 8 extending forwardly from the sides of said upper face 1, and in the leg member 9 of the upper face of the wedge or chock 2 there is provided a slot 10 for the passage therethrough of a strap 11, preferably a strap of the tongueless type, adapted to be fastened around the rim 12 of the wheel in order to secure said wedge or chock to the said wheel.

In use, the wedge or chock 2 is placed under the wheel so that the upper face 1 of said wedge or chock 2 contacts with the tyre 3, and the tyre 3 takes between the opposed lugs 8 of said upper face 1. The wedge or chock 2 is then strapped to the wheel, and the vehicle is moved by the motor engine power, with the result that the wedge or chock 2 first pivots, by its curved lower face 5 rolling on the ground, so that the vehicle is raised slightly higher than is sufficient to allow of the removal of the wheel.

The vehicle is then further moved so that the wedge or chock 2 tilts on its heel 7 on to the sharply inwardly bent base 6, thereby quickly lowering the vehicle so that the same comes to rest and is supported by its axle, or a spring, engaging a suitably positioned prop of a height such that the wheel is sufficiently clear of the ground, whereupon the wedge or chock is removed and the wheel is then changed.

When the new wheel has been put on, the wedge or chock is then placed under the wheel, but is not strapped thereto. The vehicle is then moved by engine power so that the wedge or chock is tilted, on its lower curved face, only sufficiently to allow of the removal of the prop, whereupon the vehicle is reversely moved, with the result that the wheel rolls down the upper curved face of the wedge or chock on to the ground, the said wedge or chock pivoting upon the ground during this movement.

The wedge, chock, or cradle will be made in sizes to suit the various sized wheels, and as said wheels do not vary greatly in size, two or three standard size wedges, chocks, or cradles will cover all requirements.

The lower face of the wedge, chock, or cradle is formed with transversely disposed ribs thereon to effect a grip on the ground.

I claim:—

A device for jacking-up automobiles comprising a metallic shoe in the form of an open triangular frame which is of T-shape in cross-section, the web of the T being inwardly directed, and continuous around the shoe, the longest member of said triangle being inwardly curved from end to end to conform with the peripheral contour of a road-wheel tyre, a plurality of projecting transverse ribs on the outer surface of the said longest member, a plurality of lugs outwardly projecting from and disposed at the sides of the said longest member, for ensuring correct lateral positioning of the shoe on the tyre, a slot formed through the web of the said longest member adjacent the junction of the shortest and longest members, and an adjustable strap engaged in said transverse slot and adapted to pass transversely around the wheel rim and tyre, the third side of the frame, which forms a rocking surface for contact with the ground, having a configuration composed of a multiplicity of straight portions angularly disposed in relation to one another.

THOMAS ERNEST CHARLES LINTERN.